Dec. 22, 1970 S. L. FREENY 3,550,021

SYSTEM FOR SETTING THE SLOPE OF A DATA SIGNAL TO ZERO AT THE SAMPLING INSTANTS WITHOUT MODIFYING THE DATA SIGNAL VALUES

Filed Oct. 18, 1968

INVENTOR
S. L. FREENY
BY [signature]
ATTORNEY

United States Patent Office 3,550,021

Patented Dec. 22, 1970

3,550,021

SYSTEM FOR SETTING THE SLOPE OF A DATA SIGNAL TO ZERO AT THE SAMPLING INSTANTS WITHOUT MODIFYING THE DATA SIGNAL VALUES

Stanley L. Freeny, Middletown, N.J., assignor to Bell Telephone Laboratories, Incorporated, Murray Hill, N.J., a corporation of New York Filed Oct. 18, 1968, Ser. No. 768,812
Int. Cl. H03k *5/00*
U.S. Cl. 328—151 5 Claims

ABSTRACT OF THE DISCLOSURE

It has been found that the derivative of a data signal can be brought to zero at all sampling instants without effecting the value of the signal at the sampling instants by differentiating the data signal, modulating the differentiated signal with a sine wave having a frequency equal to the data rate and adding the modulated signal to the original data signal.

FIELD OF THE INVENTION

This invention relates to a system for altering preselected characteristics of a waveform and particularly to a system for setting the slope of a data signal to zero at the sampling instants without modifying the data signal values.

BACKGROUND OF THE INVENTION

When coded data is transmitted as a data signal from one point to another, information is represented as discrete voltage levels at predetermined sampling instants separated by predetermined time intervals. A digital data signal represents information with two levels while multilevel data signals employ a plurality of levels.

To most efficiently utilize tranmission facilities data is normally sent at a rate so that the voltage at the receiving end of the transmission facility maintains the discrete levels only at the predetermined instants. Typically, the signal will pass through the discrete level at the sampling instant going from one value to another. The slope of the signal at the sampling instant, therefore, is not zero.

When data is transmitted at low rates, for example, over voiceband transmission lines, existing circuitry can adequately sample and store the value of the data signal at the sampling instant without regard to the slope of the signal. As the sampling rate increases, the slope of the data signal at the sampling instant becomes more and more critical.

When data is sent at a megacycle rate, for example, it is necessary to sample the signal during a few nanoseconds to determine the level at particular sampling instants. Sampling circuits operating at these speeds are quite sensitive to the slope of the signal being sampled.

BRIEF DESCRIPTION OF THE INVENTION

To bring the derivative of a data signal to zero at the sampling instant without altering the signal values, the present invention employs a circuit which differentiates the data signal, modulates the differentiated signal with a sine wave having a frequency equal to the data rate and adds the modulated signal to the original data signal.

A low pass filter is employed to remove higher frequency modulation products.

DETAILED DESCRIPTION

Figure 2A:
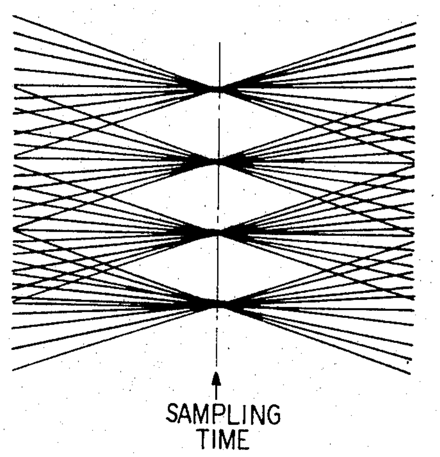
FIG. 2 shows a data signal before and after passing through the system of FIG. 1.

A multilevel data signal, displayed on a properly synchronized oscilloscope appears as an eye pattern, see FIG. 2A. It is seen that at a sampling time, the signal assumes one of four discrete levels. At the times therebetween, any level may be assumed. The slope, therefore, of the data signal at the sampling instant is not predictable.

Figure 1:
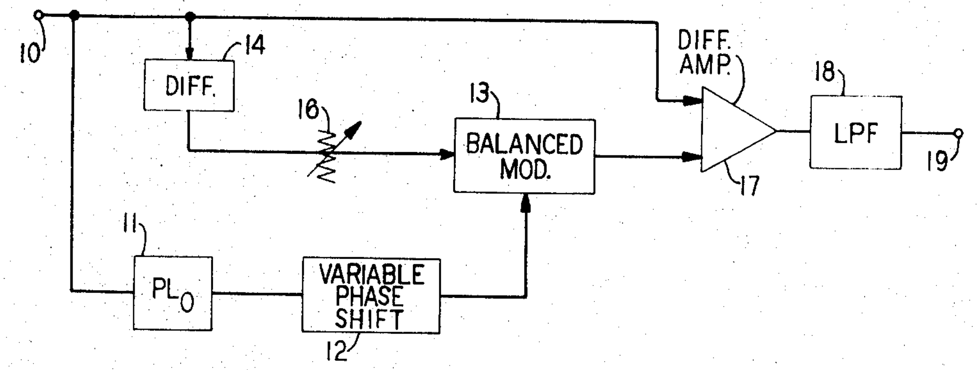
FIG. 1 is a block diagram showing a system embodying the principles of this invention.
Figure 2B:
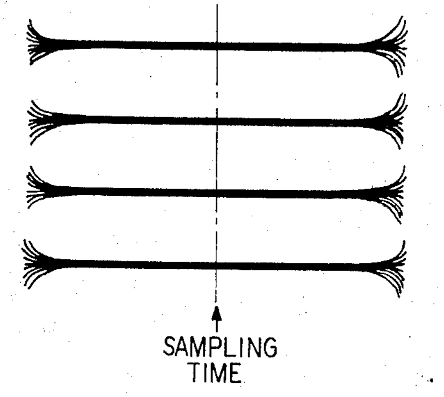

The system shown in FIG. 1 operates upon a signal, such as shown in FIG. 2A, to provide a signal, such as the one shown in FIG. 2B.

The received multilevel data signal is applied, see FIG. 1, to an input terminal 10. A phase-locked oscillator 11 provides a sine wave having a frequency equal to the sampling rate of the received data signal and having a fixed phase relationship thereto. The sine wave from the phase locked oscillator 11 is applied through a variable phase shifting network 12 as a carrier for a balanced modulator 13. The received data signal is also differentiated by differentiating network 14 and applied through a variable attenuator 16 to the balanced modulator 13 to provide a modulated signal as one input to a differential amplifier 17. The received data signal is applied directly as an input to the differential amplifier 17. The output of the differential amplifier 17 is filtered by low pass filter 18 to provide the signal shown in FIG. 2B on terminal 19.

In operation, the variable attenuator 16 and the variable phase shifter 12 are normally adjusted until the proper waveform appears on the terminal 19. It should be understood that adaptive systems can be designed to adjust these parameters.

The following is a mathematical proof that the circuit described brings the derivative of the received signal to zero at the sampling instants: Let $x(t)$ be the original pulse signal applied at terminal 10 of FIG. 2 and $y(t)$ be the output signal appearing at terminal 19.

The signals applied to balanced modulator 13 are the derivative of $x(t)$ which is $x'(t)$ and $$\text{sine } 2\pi \frac{t}{T}$$

where T is the pulse repetition rate of $x(t)$.

The lowest frequency component supplied by balanced modulator 13 to the differential amplifier 17 is $$x'(t) \frac{T}{2\pi} \text{sine } 2\pi \frac{t}{T}$$

The output from differential amplifier 17 is therefore equal to the difference between $x(t)$ and the signal supplied by the balanced modulator 13.

With the low pass filter 18 suppressing all signals having frequencies greater than $$x'(t) \frac{T}{2\pi} \text{sine } 2\pi \frac{t}{T}$$

$$y(t) = x(t) - x'(t) \frac{T}{2\pi} \text{sine } 2\pi \frac{t}{T} \quad (1)$$

We now verity that the sample values of $y(t)$ are the same as those of $x(t)$. Assume the sampling instants to be $t=nT$, $n=0, \pm 1, \pm 2 \ldots$; then, the sample values $y(nt)$ are $$y(nT) = x(nT) - x'(nT) \frac{T}{2\pi} \text{sine } 2n\pi = x(nT) \quad (2)$$

We now verify that the first derivative of $y(t)$, evaluated at the sampling times, is always zero.

$$y'(t)=x'(t)-x'(t)\cos 2\pi\frac{t}{T}-x''(t)\frac{T}{2\pi}\text{sine } 2\pi\frac{t}{T}$$

$$y'(nT)=x'(nT)-x'(nT)\cos 2\pi n-x''(nT)\frac{T}{2\pi}\text{sine } 2n\pi$$

$$=0 \qquad (3)$$

It is to be understood that the above-described arrangement is illustrative of the application of the principles of this invention. Numerous other arrangements may be devised by those skilled in the art without departing from the spirit and scope of the invention.

What is claimed is:

1. In combination:
means responsive to a received data signal for providing a differentiated data signal;
means for providing a carrier signal;
means for modulating said carrier signal with said differentiated data signal to provide a modulated signal; and
means for adding said received data signal to said modulated signal.

2. The combination as defined in claim 1 in which said carrier signal providing means is responsive to said received data signal thereby providing a carrier signal having a frequency related to a characteristic of said data signal.

3. The combination as defined in claim 2 also including:
a variable phase shifter interposed between said carrier signal providing means and said adding means.

4. The combination as defined in claim 3 also including:
a low pass filter following said adding means.

5. In combination:
a differential amplifier having first and second input terminals;
a balanced modulator having a carrier input terminal, a modulating signal input terminal and an output terminal;
means for connecting said output terminal to said first input terminal;
a differentiator for driving said modulating signal input terminal;
a phase locked oscillator circuit for driving said carrier input terminal; and
means for applying a common signal to said phase locked oscillator, said differentiator and said second input terminal.

References Cited

UNITED STATES PATENTS 3,387,221 6/1968 Arberman et al. ---- 328—165X

DONALD D. FORRER, Primary Examiner

R. C. WOODBRIDGE, Assistant Examiner

U.S. Cl. X.R.

178—69; 307—263; 328—114, 162; 332—48